(12) United States Patent
Miyazaki et al.

(10) Patent No.: US 12,312,459 B2
(45) Date of Patent: May 27, 2025

(54) AQUEOUS RESIN COMPOSITION

(71) Applicant: TOYOBO MC Corporation, Osaka (JP)

(72) Inventors: Keitaro Miyazaki, Hyogo (JP); Kenji Kashihara, Hyogo (JP)

(73) Assignee: TOYOBO MC CORPORATION, Osaka (JP)

( * ) Notice: Subject to any disclaimer, the term of this patent is extended or adjusted under 35 U.S.C. 154(b) by 762 days.

(21) Appl. No.: 17/602,565

(22) PCT Filed: Mar. 26, 2020

(86) PCT No.: PCT/JP2020/013588
§ 371 (c)(1),
(2) Date: Oct. 8, 2021

(87) PCT Pub. No.: WO2020/209080
PCT Pub. Date: Oct. 15, 2020

(65) Prior Publication Data
US 2022/0195168 A1 Jun. 23, 2022

(30) Foreign Application Priority Data
Apr. 11, 2019 (JP) ................. 2019-075385

(51) Int. Cl.
C08L 23/26 (2025.01)
C08L 33/10 (2006.01)
C09D 7/65 (2018.01)
C09D 11/107 (2014.01)
C09J 7/24 (2018.01)

(52) U.S. Cl.
CPC ............ C08L 23/26 (2013.01); C08L 33/10 (2013.01); C09D 7/65 (2018.01); C09D 11/107 (2013.01); C09J 7/245 (2018.01); C08L 2201/54 (2013.01)

(58) Field of Classification Search
CPC ........... C09J 7/245; C08L 23/26; C08L 33/10; C08L 2201/54
USPC ........................................................ 524/523
See application file for complete search history.

(56) References Cited

U.S. PATENT DOCUMENTS

| | | | |
|---|---|---|---|
| 4,755,553 A | 7/1988 | Kishimura et al. | |
| 5,534,577 A | 7/1996 | Namba et al. | |
| 5,559,176 A | 9/1996 | Namba et al. | |
| 5,563,195 A | 10/1996 | Namba et al. | |
| 2004/0147684 A1 | 7/2004 | Masuda et al. | |
| 2005/0124753 A1 | 6/2005 | Ashihara et al. | |
| 2007/0106029 A1 | 5/2007 | Nakamura et al. | |
| 2008/0287594 A1 | 11/2008 | Kashihara | |
| 2009/0018251 A1 | 1/2009 | Ashihara et al. | |
| 2015/0147502 A1* | 5/2015 | Lindenmuth | C09D 133/08 524/522 |
| 2018/0305592 A1 | 10/2018 | Yokomichi et al. | |
| 2018/0371142 A1 | 12/2018 | Komoto | |

FOREIGN PATENT DOCUMENTS

| | | | | |
|---|---|---|---|---|
| CN | 1809601 | | 7/2006 | |
| GB | 2 131 439 | | 6/1984 | |
| JP | 59-75958 | | 4/1984 | |
| JP | 60-99138 | | 6/1985 | |
| JP | 6-16746 | | 1/1994 | |
| JP | 6-80738 | | 3/1994 | |
| JP | 6-256592 | | 9/1994 | |
| JP | 7-173347 | | 7/1995 | |
| JP | 8-12913 | | 1/1996 | |
| JP | 2002-188042 | | 7/2002 | |
| JP | 2004-107539 | | 4/2004 | |
| JP | 2004-256577 | | 9/2004 | |
| JP | 2007-112881 | | 5/2007 | |
| JP | 2010-1334 | | 1/2010 | |
| JP | 2011-016992 | | 1/2011 | |
| JP | 2011016992 A | * | 1/2011 | ............ C08F 255/02 |
| JP | 2012-207167 | | 10/2012 | |
| JP | 2012-219123 | | 11/2012 | |
| JP | 2012219123 A | * | 11/2012 | |
| JP | 2014-51757 | | 3/2014 | |
| JP | 2014051757 A | * | 3/2014 | |

(Continued)

OTHER PUBLICATIONS

Office Action issued Apr. 16, 2024 in corresponding Japanese Patent Application No. 2021-513563, with English translation.

(Continued)

*Primary Examiner* — Kelechi C Egwim
(74) *Attorney, Agent, or Firm* — Wenderoth, Lind & Ponack, L.L.P.

(57) ABSTRACT

This invention provides an aqueous resin composition mixture of polyolefin and acrylic for paints, inks, adhesives, sealing agents, or primers, the aqueous resin composition exhibiting high peel strength even when baked at 80° C. on polyolefin substrates, and maintaining adhesion although an acrylic component is contained. Provided is an aqueous resin composition comprising an acid-modified polyolefin resin (A) and a (meth)acrylic acid ester copolymer (B), wherein the acid-modified polyolefin resin (A) contains an unsaturated carboxylic acid or an anhydride thereof in an amount of 0.5 to 10 mass %, and wherein the (meth)acrylic acid ester copolymer (B) contains as copolymerization components a (meth)acrylic acid ester (B1), whose ester moiety is a hydrocarbon group with 12 or more carbon atoms, and a (meth)acrylic acid ester (B2), whose ester moiety is a hydrocarbon group with 11 or less carbon atoms.

13 Claims, No Drawings

(56) References Cited

FOREIGN PATENT DOCUMENTS

| TW | 201406861 | 2/2014 |
| WO | 2006/011402 | 2/2006 |
| WO | 2017/073153 | 5/2017 |
| WO | 2018/128111 | 7/2018 |

OTHER PUBLICATIONS

Wu Haotian et al., "New progress in synthesis and application of functionalized polyolefin graft copolymers", Chemical Industry and Engineering Progress, vol. 34, Issue 6, pp. 1699-1707, 2015, English abstract.

Office Action issued Jul. 20, 2022 in corresponding Chinese Patent Application No. 202080028093.2, with English language translation.

International Search Report issued Jun. 9, 2020 in International (PCT) Application No. PCT/JP2020/013588.

Extended European Search Report issued Dec. 15, 2022 in European Patent Application No. 20786708.6.

* cited by examiner

AQUEOUS RESIN COMPOSITION

TECHNICAL FIELD

The present invention relates to an aqueous resin composition that exhibits high adhesion to polyolefin substrates.

BACKGROUND ART

Typically, polyolefin resins, such as polypropylene, polyethylene, ethylene-propylene copolymers, ethylene-propylene-diene copolymers, and poly(4-methyl-1-pentene), are relatively inexpensive and exhibit excellent performance, including chemical resistance, water resistance, heat resistance, etc. Such polyolefin resins are used in a wide range of applications as a material for automotive parts, electrical components, building materials, packaging films, etc. However, coating or bonding polyolefin resins, which are crystalline and nonpolar, is difficult.

For coating or bonding such difficult-to-bond polyolefin resins, chlorinated polyolefins, which show strong adhesion to polyolefin resins, have been used as a binder resin (see Patent Literature (PTL) 1 and PTL 2). In order to compensate for disadvantages of chlorinated polyolefins, such as poor adhesion to substrates or limited target materials for adhesion, a chlorinated polyolefin is mixed with an acrylic, urethane, or polyester resin, or graft-polymerized with these resins to give a binder composition for use in coating or bonding (see PTL 3 and PTL 4).

However, most of these binder compositions are used in a dissolved form in an organic solvent, such as toluene and xylene. Thus, during coating, a large amount of the organic solvent is released into the atmosphere, which is undesirable from the standpoint of, for example, environmental and public health aspects.

To address this issue, polyolefin-resin-containing aqueous resin compositions that contain no organic solvent have been proposed (see PTL 5 and PTL 6). However, in these compositions, a polyolefin resin itself has a low polarity. Therefore, when these compositions are used by mixing with an acrylic, urethane, epoxy, or polyester resin, they are not easily compatible with each other, resulting in failure in obtaining expected physical properties.

To address this issue, emulsion production methods have been proposed. In these methods, polyolefin is dissolved in acrylic monomers and subjected to phase inversion emulsification, followed by polymerization of the monomers (see PTL 7 and PTL 8). These production methods can reduce costs by shortening the solvent-removal process. Furthermore, the resulting aqueous resin composition, which comprises an acrylic resin, has excellent compatibility with other resins.

PTL 1: JPS59-75958A
PTL 2: JPS60-99138A
PTL 3: JPH06-16746A
PTL 4: JPH08-12913A
PTL 5: JPH06-256592A
PTL 6: JP2004-107539A
PTL 7: JPH06-80738A
PTL 8: JP2010-001334A

SUMMARY OF INVENTION

Technical Problem

However, half of the resin content in these compositions is acrylic, and the peel strength on polyolefin substrates is undesirably reduced.

An object of the present invention is to solve the above problems and provide an aqueous resin composition mixture of polyolefin and acrylic for paints, inks, adhesives, sealing agents, or primers, the aqueous resin composition exhibiting high peel strength even when baked at 80° C. on polyolefin substrates, and maintaining adhesion although an acrylic component is contained.

Solution to Problem

The present inventors have found that the above problems can be solved by an aqueous resin composition that comprises an acid-modified polyolefin resin (A) and a (meth) acrylic acid ester copolymer (B), the (meth)acrylic acid ester copolymer (B) containing a (meth)acrylic acid ester (B1), whose ester moiety is a hydrocarbon group with 12 or more carbon atoms, and a (meth)acrylic acid ester (B2), whose ester moiety is a hydrocarbon group with 11 or less carbon atoms.

The present invention is as described below.

An aqueous resin composition comprising an acid-modified polyolefin resin (A) and a (meth)acrylic acid ester copolymer (B), wherein the acid-modified polyolefin resin (A) contains an unsaturated carboxylic acid or an anhydride thereof in an amount of 0.5 to 10.0 mass %, and wherein the (meth)acrylic acid ester copolymer (B) contains a (meth) acrylic acid ester (B1), whose ester moiety contains 12 or more carbon atoms, and a (meth)acrylic acid ester (B2), whose ester moiety contains 11 or less carbon atoms.

It is preferred that the (meth)acrylic acid ester copolymer (B) further contains at least one polar-group-containing monomer (B3) selected from polar-group-containing (meth) acrylic acid esters, (meth)acrylic acids, and (meth)acrylamides.

It is preferred that the aqueous resin composition comprises a surfactant or a basic compound, or both, in addition to the acid-modified polyolefin resin (A) and the (meth) acrylic acid ester copolymer (B), and it is preferred that the content of the (meth)acrylic acid ester copolymer (B) is 40 to 250 parts by mass per 100 parts by mass of the acid-modified polyolefin resin (A).

It is preferred that the (meth)acrylic acid ester copolymer (B) contains the (meth)acrylic acid ester (B1), whose ester moiety is a hydrocarbon group with 12 or more carbon atoms, and the (meth)acrylic acid ester (B2), whose ester moiety is a hydrocarbon group with 11 or less carbon atoms, in a mass ratio of 70/30 to 20/80.

It is preferred that the (meth)acrylic acid ester copolymer (B) has a glass transition temperature (Tg) of −40° C. to 80° C., and it is preferred that the acid-modified polyolefin resin (A) has a melting point measured by differential scanning calorimetry (DSC) of 90° C. or lower.

The aqueous resin composition according to any one of the above can be used for paints, inks, adhesives, sealing agents, or primers for polyolefin films, sheets, or molded articles.

Advantageous Effects of Invention

The aqueous resin composition according to the present invention shows excellent water resistance and excellent adhesion even when baked at 80° C. on polyolefin substrates. Although the aqueous resin composition comprises an acrylic resin, the aqueous resin composition exhibits high peel strength comparable to that of an acid-modified polyolefin resin alone. Further, the present invention is capable of providing an aqueous resin composition for paints, inks, adhesives, sealing agents, or primers. This aqueous resin composition has excellent compatibility with various polar resins, and is obtained by a production process in which solvent-removal process is shortened since no organic solvent is contained.

DESCRIPTION OF EMBODIMENTS

The present invention is described in detail below.

The aqueous resin composition according to the present invention is characterized by comprising an acid-modified polyolefin resin (A) and a (meth)acrylic acid ester copolymer (B), wherein the acid-modified polyolefin resin (A) contains an unsaturated carboxylic acid or an anhydride thereof in an amount of 0.5 to 10.0 mass %, and wherein the (meth)acrylic acid ester copolymer (B) contains a (meth) acrylic acid ester (B1), whose ester moiety is a hydrocarbon group with 12 or more carbon atoms, and a (meth)acrylic acid ester (B2), whose ester moiety is a hydrocarbon group with 11 or less carbon atoms.

Acid-Modified Polyolefin Resin (A)

The acid-modified polyolefin resin (A) for use in the present invention is obtained by, for example, graft copolymerization of at least one polyolefin selected from polypropylene, propylene-$\alpha$-olefin copolymers, polyethylene, ethylene-$\alpha$-olefin copolymers, poly-1-butene, and 1-butene-$\alpha$-olefin copolymers, with at least one member selected from $\alpha,\beta$-unsaturated carboxylic acids and acid anhydrides thereof.

The propylene-$\alpha$-olefin copolymer as used herein mainly comprises propylene that is copolymerized with an $\alpha$-olefin. Examples of $\alpha$-olefins include $\alpha$-olefins with 2 or 4 to 20 carbon atoms, such as ethylene, 1-butene, 1-pentene, 1-hexene, 1-heptene, 1-octene, 1-decene, 1-dodecene, 1-hexadecene, and 4-methyl-1-pentene. The content of the propylene component in the propylene-$\alpha$-olefin copolymer is preferably 50 mol % or more, and more preferably 70 mol % or more. When the content of the propylene component is 50 mol % or more, excellent adhesion to polypropylene substrates is obtained.

The ethylene-$\alpha$-olefin copolymer mainly comprises ethylene that is copolymerized with an $\alpha$-olefin. Examples of $\alpha$-olefins include $\alpha$-olefins with 3 to 20 carbon atoms, such as propylene, 1-butene, 1-pentene, 1-hexene, 1-heptene, 1-octene, 1-decene, 1-dodecene, 1-hexadecene, and 4-methyl-1-pentene. The content of the ethylene component in the ethylene-$\alpha$-olefin copolymer is preferably 75 mol % or more. When the content of the ethylene component is 75 mol % or more, excellent adhesion to polyethylene substrates is obtained.

The 1-butene-$\alpha$-olefin copolymer mainly comprises 1-butene that is copolymerized with an $\alpha$-olefin. Examples of $\alpha$-olefins include $\alpha$-olefins with 2 to 3 or 5 to 20 carbon atoms, such as ethylene, propylene, 1-pentene, 1-hexene, 1-heptene, 1-octene, 1-decene, 1-dodecene, 1-hexadecene, and 4-methyl-1-pentene. The content of the 1-butene component in the 1-butene-$\alpha$-olefin copolymer is preferably 65 mol % or more. When the content of the 1-butene component is 65 mol % or more, excellent adhesion to polypropylene substrates and poly 1-butene substrates is obtained.

Examples of $\alpha,\beta$-unsaturated carboxylic acids and acid anhydrides thereof for graft copolymerization with polyolefins include maleic acid, maleic anhydride, fumaric acid, citraconic acid, citraconic anhydride, mesaconic acid, itaconic acid, itaconic anhydride, aconitic acid, aconitic anhydride, and nadic anhydride. Among these, maleic anhydride and itaconic anhydride are preferred.

The content of the $\alpha,\beta$-unsaturated carboxylic acid component or a component of an acid anhydride thereof in the acid-modified polyolefin resin (A) is 0.5 to 10 mass %, preferably 0.7 mass % or more, and more preferably 1 mass % or more. The content is preferably 5 mass % or less, and more preferably 3 mass % or less. When the content of the $\alpha,\beta$-unsaturated carboxylic acid component or the component of an acid anhydride thereof is within this range, phase inversion emulsification is easily achieved, and a coating film obtained from the aqueous resin composition has excellent water resistance.

Graft copolymerization of at least one polyolefin with at least one member selected from $\alpha,\beta$-unsaturated carboxylic acids and acid anhydrides thereof may be performed by known methods, such as a method in which the polyolefin is melted by heating to the melting point or higher in the presence of a radical generator to allow a reaction to occur (melting method), and a method in which the polyolefin is dissolved in an organic solvent, and the resulting product is stirred with heating in the presence of a radical generator to allow a reaction to occur (solution method).

The acid-modified polyolefin resin (A) for use in the present invention has a weight average molecular weight, measured by high-temperature gel permeation chromatography (GPC), of preferably 3000 to 200000, more preferably 10000 or more, even more preferably 30000 or more, and particularly preferably 45000 or more. The weight average molecular weight is preferably 150000 or less, and more preferably 120000 or less. When the weight average molecular weight is within this range, the acid-modified polyolefin dissolves in the (meth)acrylic acid ester (B1) and the (meth) acrylic acid ester (B2) in an excellent manner, and phase inversion emulsification is easily achieved. Additionally, sufficient cohesive strength of the resin and excellent adhesive strength are obtained.

The measurement of weight average molecular weight by high-temperature GPC can be performed according to a known method with a commercially available apparatus using ortho-dichlorobenzene as a solvent and polystyrene as the standard substance. Specifically, the measurement is performed at 140° C. with a GPC150-C Plus apparatus produced by Nihon Waters K.K., using ortho-dichlorobenzene as a solvent. The columns for use are a GMH6-HT and GMH6-HTL produced by Tosoh Corporation. The weight average molecular weight is determined using polystyrene of known molecular weight as the standard substance.

The acid-modified polyolefin resin (A) may be further modified by chlorination. Chlorinated polyolefins are preferably acid-modified chlorinated polyolefins obtained by chlorination of the acid-modified polyolefin resins described above. From the standpoint of solution stability and adhesion between polyolefin substrates and resin substrates or metal substrates, when the acid-modified polyolefin resin (A) is chlorinated, the lower limit of the chlorine content is preferably 5 mass % or more, more preferably 8 mass % or more, even more preferably 10 mass % or more, particularly preferably 12 mass % or more, and most preferably 14 mass % or more. If the content is 5 mass % or more, excellent solution stability is obtained, and emulsification is easily achieved. The upper limit is preferably 40 mass % or less, more preferably 38 mass % or less, even more preferably 35 mass % or less, particularly preferably 32 mass % or less, and most preferably 30 mass % or less. If the content is 40 mass % or less, the crystallinity of the acid-modified chlorinated polyolefin increases, and higher adhesive strength is easily obtained.

The chlorine content in the acid-modified chlorinated polyolefin can be measured by titration in accordance with JIS K-7229-1995.

In the present invention, the melting point of the acid-modified polyolefin resin (A), measured by differential scanning calorimetry (referred to below as "DSC"), is preferably 90° C. or lower, more preferably 85° C. or lower, and particularly preferably 80° C. or lower. When the melting point is within this range, desirable film-forming properties are obtained when baked at 80° C., and excellent adhesion to polyolefin substrates, water resistance, and peel strength are obtained.

In the present invention, the measurement of melting point by DSC can be performed in accordance with JIS K7121-2012, for example, under the following conditions. Specifically, a DSC measurement apparatus (produced by Seiko Instruments Inc.) is used, and about 5 mg of a sample is heated at 150° C. for 10 min and kept in a molten state. Thereafter, the temperature is lowered at a rate of 10° C./min, and the resulting product is held stable at −50° C. The temperature is then increased to 150° C. at 10° C./min, and the peak melting temperature at which the sample is melted is measured. The obtained temperature is used as the melting point for evaluation. The melting point in the Examples below were measured under the conditions described above.

(Meth)acrylic Acid Ester Copolymer (B)

The (meth)acrylic acid ester copolymer (B) for use in the present invention contains, as copolymerization components, a (meth)acrylic acid ester (B1), whose ester moiety is a hydrocarbon group with 12 or more carbon atoms, and a (meth)acrylic acid ester (B2), whose ester moiety is a hydrocarbon group with 11 or less carbon atoms. These esters (B1) and (B2) may be sometimes simply referred to below as "(B1)" and "(B2)".

When (B1) and (B2) are contained, the acid-modified polyolefin resin (A) is sufficiently dissolved, and phase inversion emulsification is easily achieved. Furthermore, although an acrylic component is contained, excellent adhesion to polyolefin substrates is obtained. Furthermore, the affinity with resins other than polyolefins increases, which results in excellent compatibility with other resins in the resulting coating film.

The content of the (meth)acrylic acid ester copolymer (B) is preferably 40 to 250 parts by mass per 100 parts by mass of the acid-modified polyolefin resin (A). The content is more preferably 80 to 200 parts by mass, and still more preferably 100 to 150 parts by mass. When the content of (B) is within the range of 40 to 250 parts by mass, phase inversion emulsification of the acid-modified polyolefin resin (A) is easily achieved, and excellent adhesion to polyolefin resin substrates is obtained.

(Meth)acrylic Acid Ester (B1)

Examples of the (meth)acrylic acid ester (B1), whose ester moiety is a hydrocarbon group with 12 or more carbon atoms, for use in the present invention include acrylic monomers, such as dodecyl (meth)acrylate (i.e., lauryl (meth)acrylate), tridecyl (meth)acrylate, tetradecyl (meth)acrylate, pentadecyl (meth)acrylate, hexadecyl (meth)acrylate, heptadecyl (meth)acrylate, stearyl (meth)acrylate, isostearyl (meth)acrylate, nonadecyl (meth)acrylate, icosyl (meth)acrylate, henicosyl (meth)acrylate, behenyl (meth)acrylate, tricosyl (meth)acrylate, tetracosyl (meth)acrylate, pentacosyl (meth)acrylate, hexacosyl (meth)acrylate, heptacosyl (meth)acrylate, octacosyl (meth)acrylate, nonacosyl (meth)acrylate, triacontyl (meth)acrylate, hentriacontyl (meth)acrylate, dotriacontyl (meth)acrylate, tetratriacontyl (meth)acrylate, and pentatriacontyl (meth)acrylate. The hydrocarbon group may be linear or branched, and may have a cyclic structure. These monomers may be used alone or in a combination of two or more.

The ester moiety in the (meth)acrylic acid ester (B1) preferably has 12 or more and 35 or less carbon atoms, and more preferably 18 or less carbon atoms. When the ester moiety has 12 or more and 35 or less carbon atoms, desirable solubility of the acid-modified polyolefin resin (A) and desirable polymerizability during emulsion polymerization are obtained.

(Meth)acrylic Acid Ester (B2)

Examples of the (meth)acrylic acid ester (B2), whose ester moiety is a hydrocarbon group with 11 or less carbon atoms, for use in the present invention include methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, 2-ethylhexyl (meth)acrylate, cyclohexyl (meth)acrylate, tert-butylcyclohexyl (meth)acrylate, isobornyl (meth)acrylate, and dicyclopentanyl (meth)acrylate. These monomers may be used alone or in a combination of two or more.

The ester moiety in the (meth)acrylic acid ester (B2) preferably has 1 or more and 10 or less carbon atoms, and more preferably 8 or less carbon atoms. When the ester moiety has 1 or more and 10 or less carbon atoms, desirable solubility of the acid-modified polyolefin is obtained, and phase inversion emulsification and emulsion polymerization are easily performed.

The mass ratio of the (meth)acrylic acid ester (B1), whose ester moiety is a hydrocarbon group with 12 or more carbon atoms, and the (meth)acrylic acid ester (B2), whose ester moiety is a hydrocarbon group with 11 or less carbon atoms, in the (meth)acrylic acid ester copolymer (B) for use in the present invention is preferably 70/30 to 20/80, and more preferably 60/40 to 40/60. When the mass ratio is within this range, the solubility of the acid-modified polyolefin resin (A) increases, and phase inversion emulsification is easily achieved. Furthermore, the affinity of the (meth)acrylic acid ester copolymer with a polyolefin substrate improves, and excellent adhesion to polyolefin substrates is obtained.

Polar-Group-Containing Monomer (B3)

The (meth)acrylic acid ester copolymer (B) for use in the present invention may further be copolymerized with a polar-group-containing monomer (B3) (which is sometimes simply referred to below as "(B3)"). (B3) differs from (B1) and (B2). Further, (B3) for use may be, for example, a (meth)acrylic acid ester whose ester moiety contains a polar group, a (meth)acrylic acid, or a (meth)acrylamide. (B3) may be at least one member selected from these. Examples of the polar groups of acrylic acid esters whose ester moiety contains a polar group include hydroxyl, carboxyl, phosphoric acid, amino, amide, ether, and epoxy groups. Of these, amide and hydroxyl groups are preferably used, and a hydroxyl group is more preferably used. Examples of acrylic acid esters whose ester moiety contains a polar group include 2-hydroxyethyl (meth)acrylate, 2-hydroxypropyl (meth)acrylate, 2-hydroxybutyl (meth)acrylate, 4-hydroxybutyl (meth)acrylate, dicyclopentenyl (meth)acrylate, glycidyl (meth)acrylate, methylglycidyl (meth)acrylate, 3,4-epoxycyclohexanemethyl methacrylate, tetrahydrofurfuryl (meth)acrylate, polyethylene glycol mono(meth)acrylate, polyethylene glycol di(meth)acrylate, polypropylene glycol mono(meth)acrylate, polypropylene glycol di(meth)acrylate, polytetramethylene glycol mono(meth)acrylate, polytetramethylene glycol di(meth)acrylate, dimethylaminoethyl (meth)acrylate, and diethylaminoethyl (meth)acrylate.

Examples of acrylamides include (meth)acrylamide, dimethyl (meth)acrylamide, diethyl (meth)acrylamide, and dimethylaminopropyl (meth)acrylamide. It is preferable to use one or more types of (B3), and it is more preferable to use two or more types of (B3) with the same polar group. The use of (B3) in combination with (B1) and (B2) achieves more excellent adhesion to polar substrates and topcoat paints, compared to the use of only (B1) and (B2). (B3) alone does not satisfactorily dissolve the acid-modified polyolefin resin (A); however, when (B3) is used in combination with (B1) and (B2), excellent compatibility with the acid-modified polyolefin resin (A) is obtained.

In the present invention, (B3) is preferably used in an amount of 1 to 40 mass % based on the (meth)acrylic acid ester copolymer (B). The amount is more preferably 2 mass % or more, still more preferably 4 mass % or more, and particularly preferably 6 mass % or more. Further, the amount is more preferably 30 mass % or less, still more preferably 25 mass % or less, and most preferably 20 mass % or less. When the amount is within the above range, the solubility of the acid-modified polyolefin (A) improves, and the phase inversion emulsification is easily achieved. When the polar group content in the (meth)acrylic acid ester copolymer (B) is in a desirable range, the target composition has excellent adhesion to polyolefin substrates, polar substrates, and top coat paints.

In this specification, the term "(meth)acrylate" means acrylate or methacrylate, the term "(meth)acrylic acid" means acrylic acid or methacrylic acid, and the term "(meth)acryloyl group" means acryloyl group or methacryloyl group. The term "(meth)acrylamide" means acrylamide or methacrylamide.

The (meth)acrylic acid ester copolymer (B) of the present invention may further contain polymerizable monomers other than (B1), (B2), and (B3). Examples of polymerizable monomers other than (B1), (B2), and (B3) include styrene monomers, such as styrene, α-methylstyrene, para-methylstyrene, and divinylbenzene. In addition, examples of monomers that can be used in combination other than those described above include vinyl acetate. These monomers may be used alone or in a combination of two or more.

The glass transition temperature (Tg) of the (meth)acrylic acid ester copolymer (B) is preferably −40° C. to 80° C. It is more preferably −30° C. or higher, and even more preferably −20° C. or higher. It is more preferably 60° C. or lower, and even more preferably 50° C. or lower. When the glass transition temperature is within the above range, the resulting coating film has desirable flexibility, bleeding of other components is suppressed, and excellent water resistance and excellent appearance of the resulting coating film are obtained. In addition, desirable film-forming properties when baking is performed at 80° C. are obtained, and excellent adhesion to polyolefin substrates, excellent water resistance, and excellent peel strength are obtained.

In order to design the (meth)acrylic acid ester copolymer (B) with a desired Tg, the mixing ratio of the (meth)acrylic acid ester monomers and the polar-group-containing monomer is determined in consideration of the glass transition temperatures of homopolymers obtained by homopolymerizing each of the (meth)acrylic acid ester monomers and the polar group-containing monomer (referred to below as "the Tg of the homopolymers").

Specifically, the Tg of the (meth)acrylic acid ester copolymer (B) can be calculated by using the formula for calculating the theoretical Tg of a (meth)acrylic acid ester copolymer (FOX formula).

$$1/Tg = C_1/Tg_1 + C_2/Tg_2 + \ldots + C_n/Tg_n \quad \text{(FOX formula)}$$

(In this calculation formula (FOX formula), Tg represents the theoretical Tg of a (meth)acrylic acid ester copolymer, $C_n$ represents the weight percentage of monomer n in the monomer mixture of a (meth)acrylic acid ester copolymer (B), $Tg_n$ represents the Tg of the homopolymer of monomer n, and n represents the number of monomers constituting the (meth)acrylic acid ester copolymer (B), and is a positive integer.)

For example, when lauryl methacrylate (Tg: 208.15 K, 46 mass %) is used as (B1), cyclohexyl methacrylate (Tg: 339.15 K, 46 mass %) is used as (B2), and 2-hydroxyethyl methacrylate (Tg: 328.15 K, 4 mass %) and 4-hydroxybutyl acrylate (Tg: 233.15 K, 4 mass %) are used as (B3), the calculation formula is as follows, and the calculated theoretical Tg of the copolymer is 259.1 (K), which is converted to −14.1° C.

$$1/Tg = 0.46/208.15 + 0.46/339.15 + 0.04/328.15 + 0.04/233.15$$

In the present invention, Tg refers to the theoretical Tg (° C.) obtained from the above calculation formula.

The Tg values disclosed in literature may be used for the Tg values of the homopolymers of the (meth)acrylic acid ester monomers and the polar-group-containing monomer. Examples of such literature include the (Meth)acrylic acid ester catalogue from Kyoeisha Chemical Co., Ltd.; Acrylic ester catalog from Mitsubishi Chemical Corporation; and Shin kobunshi bunko 7, toryo you gousei jushi nyuumon [New Polymer 7, Introduction to Synthetic Resins for Paints], Kyoso Kitaoka, published by Polymer Publication Society, 1997, pp. 168-169.

Surfactant

The aqueous resin composition according to the present invention may comprise a surfactant as long as the performance of the present invention is not impaired. Examples of surfactants include nonionic surfactants, anionic surfactants, cationic surfactants, and amphoteric surfactants. Of these, it is preferable to use nonionic surfactants or anionic surfactants, and it is more preferable to use nonionic surfactants, from the standpoint of the particle size of the dispersed particles and the water resistance of a coating film obtained from the target composition.

Examples of nonionic surfactants include polyoxyethylene alkyl ethers, polyoxypropylene alkyl ethers, polyoxyethylene alkylphenyl ethers, polyoxypropylene alkylphenyl ethers, polyoxyethylene styrenated phenyl ethers, polyoxypropylene styrenated phenyl ethers, polyoxyethylene fatty acid esters, polyoxypropylene fatty acid esters, polyoxyethylene sorbitan fatty acid esters, polyoxypropylene sorbitan fatty acid esters, polyoxyethylene alkylamine ethers, polyoxypropylene alkylamine ethers, polyoxyethylene lanolin alcohol ethers, polyoxypropylene lanolin alcohol ethers, polyoxyethylene lanolin fatty acid esters, polyoxypropylene lanolin fatty acid esters, and polyoxyethylene-oxypropylene block copolymers. For example, nonionic surfactants may be EMULMIN series (produced by Sanyo Chemical Industries, Ltd.), NOIGEN series (produced by DKS Co. Ltd.), and BLAUNON series (produced by Aoki Oil Industrial Co., Ltd.).

For these nonionic surfactants, it is also possible to use reactive surfactants with a polymerizable double bond in the molecule. Examples include ADEKA REASOAP ER-10, ER-20, ER-30, and ER-40 (produced by ADEKA Corporation).

Examples of anionic surfactants include higher alkyl sulfates, alkyl aryl polyoxyethylene sulfate salts, higher fatty acid salts, alkyl aryl sulfonates, and alkyl phosphate ester salts. For example, anionic surfactants may be NEOCOL series and HITENOL series (produced by DKS Co. Ltd.).

For these anionic surfactants, it is also possible to use reactive surfactants with a polymerizable double bond in the molecule. Examples include ADEKA REASOAP NE-10, NE-20, NE-30, NE-40, and SE-10N (all produced by ADEKA Corporation), Aqualon RN-20, RN-30, RN-50, HS-10, and HS-20 (all produced by DKS Co. Ltd.), and ELEMINOL1 JS-2 and ELEMINOL RS-30 (both produced by Sanyo Chemical Industries, Ltd.).

These surfactants may be used alone or in a combination of two or more.

In the present invention, the surfactant is preferably used in an amount of 5 to 60 parts by mass per 100 parts by mass of the acid-modified polyolefin resin (A) from the standpoint of easily achieving phase inversion emulsification and from the standpoint of the water resistance of the resulting coating film. The amount is more preferably 40 parts by mass or less, still more preferably 30 parts by mass or less, and even more preferably 20 parts by mass or less.

Basic Compound

In the present invention, a basic compound may further be incorporated. Further, in the production of the aqueous resin composition of the present invention, a basic compound can be used. For example, it is possible to allow a basic compound to also be present when the acid-modified polyolefin resin (A) is subjected to phase inversion emulsification. The presence of a basic compound in the system can improve the dispersibility of the acid-modified polyolefin resin (A). Examples of basic compounds include inorganic basic compounds, such as sodium hydroxide, potassium hydroxide, sodium carbonate, potassium carbonate, and ammonium carbonate; amines, such as triethylamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylamino propylamine, methyliminobispropylamine, 3-methoxypropylamine, monoethanolamine, diethanolamine, triethanolamine, morpholine, N-methylmorpholine, N-ethylmorpholine, 2-amino-2-methyl-1-propanol, and 2-dimethylamino-2-methyl-1-propanol; and ammonia.

The amount of the basic compound added is preferably 0.3 to 4.0 times the chemical equivalent, and more preferably 0.7 to 2.5 times the chemical equivalent to the carboxyl groups in the acid-modified polyolefin resin (A). If the amount is less than 0.3 times the chemical equivalent, the effect achieved by the presence of the basic compound may not be achieved. In contrast, if the amount exceeds 4.0 times the chemical equivalent, the residual amount in the dry matter of the target composition may be too large.

The aqueous resin composition of the present invention can be obtained by dissolving the acid-modified polyolefin resin (A) in a mixture liquid of (B1) and (B2) without using an organic solvent, followed by phase inversion emulsification and polymerization reaction. The phrase "without using an organic solvent" means that the organic solvent in the aqueous resin composition is 0.5 mass % or less, more preferably 0.1 mass % or less, still more preferably 0.01 mass % or less, even more preferably 0.001 mass % or less, and particularly preferably 0 mass %. Since no organic solvent is used, no concentration or deaeration is required, making it possible to simplify the production process and reduce the production costs and time. Specifically, the aqueous resin composition of the present invention can be obtained by polymerizing a (meth) acrylic acid ester after subjecting a solution of the acid-modified polyolefin resin (A) in a (meth) acrylic acid ester to phase inversion emulsification. In order to have the polymerization reaction efficiently proceed, it is preferable to use a polymerization initiator. It is preferable to use a conventional amount of a polymerization initiator that is commonly used in typical emulsion polymerization as the polymerization initiator. Examples of the polymerization initiator include potassium persulfate, ammonium persulfate, and hydrogen peroxide; azo initiators, such as 4,4'-azobis(4-cyanovaleric acid), 2,2'-azobis[N-(2-carboxyethyl)-2-methylpropionamide], 2,2'-azobis[2-methyl-N-[2-(1-hydroxybutyl)]propionamide], and 2,2'-azobis[2-methyl-N-(2-hydroxyethyl)propionamide]; and peroxide initiators, such as benzoyl peroxide, t-butyl peroxy-2-ethylhexanoate, 1,1-bis(t-butyl peroxy)-3,3,5-trimethylcyclohexane, t-butyl peroxybenzoate, di-t-butyl peroxide, t-butyl hydroperoxide, cumene hydroperoxide, p-menthane hydroperoxide, and diisopropyl benzene hydroperoxide. These initiators may be used alone or in a combination of two or more. Redox initiators can also be used. Examples include those formed of a combination of the above polymerization initiators and a reducing agent (e.g., sulfite, hydrogen sulfite, cobalt, iron, copper, and other salts with lower ionic valence numbers).

The polymerization conditions can be set as appropriate according to the polymerizable monomers used and the type of the polymerization initiators used. The polymerization temperature is usually 20 to 100° C., and preferably 50 to 90° C. The polymerization time is typically 1 to 8 hours. In order to have the polymerization reaction proceed quickly, it is preferable to replace the atmosphere in the polymerization system with an inert gas such as nitrogen gas in advance.

The Z-average particle size of the resin particles in the aqueous resin composition obtained accordingly is preferably 10 nm or more and 500 nm or less, and more preferably 200 nm or less. An average particle size exceeding 500 nm is not preferable since defects can occur in the resulting coating film, which adversely affects various physical properties and makes it difficult to use the composition, in particular, for topcoat paints.

The aqueous resin composition of the present invention can be used as a clear varnish as is. For the purpose of further improving the coating film performance, such as film-forming properties, coating film hardness, weather resistance, and flexibility, various paint additives and other resin emulsions may be blended for use as long as they do not inhibit adhesion to polyolefin substrates. For example, coalescing agents such as propylene glycol monopropyl ether, dipropylene glycol monomethyl ether, and butyl propylene glycol, defoaming agents, anti-sagging agents, wetting agents, and UV absorbers can be used. In particular, the use of the aqueous resin composition of the present invention by blending acrylic emulsions or urethane emulsions can improve coating film performance such as weather resistance, water resistance, coating strength, and flexibility.

In addition, the aqueous resin composition of the present invention may also optionally appropriately comprise a tackifier, e.g., an aqueous dispersion of rosin, dammar, polymerized rosin, hydrogenated rosin, ester rosin, rosin-modified maleic acid resin, polyterpene resin, petroleum resin, cyclopentadiene resin, phenol resin, xylene resin, and coumarone indene resin. This can improve the drying properties of the resulting coating film and the adhesion to polyolefin substrates. The amount to be added, on a solids content basis, is preferably 5 to 100 parts by mass, and more preferably 10 to 50 parts by mass, per 100 parts by mass of the solids content the resin composition. If the amount added is less than 5 parts by mass, the effect of the addition may not be obtained. However, an amount too large, i.e., exceeding 100 parts by mass, may adversely affect the adhesion instead.

The aqueous resin composition of the present invention can be suitably used for paints, inks, adhesives, sealing agents, primers, etc. for various polyolefin substrates, including polypropylene. However, the usage is not limited to these substrates, and the aqueous resin composition of the present invention can be applied to, for example, other plastic, wood, and metals. Polyolefin substrates may be films, sheets, molded articles, and the like. Application methods are not particularly limited. Further, the resulting coating film may be dried at an ordinary temperature. Drying is preferably performed at 30 to 120° C., and more preferably 60 to 100° C.

EXAMPLES

Next, the present invention is described in detail with reference to Examples. However, the present invention is not limited to these Examples.
(1) Measurement of Weight Average Molecular Weight by High-Temperature GPC The measurement was performed at 140° C. with a GPC150-C Plus apparatus produced by Nihon Waters K.K., using ortho-dichlorobenzene as a solvent (columns: GMH6-HT and GMH6-HTL, produced by Tosoh Corporation). The weight average molecular weight was determined using polystyrene of known molecular weight as the standard substance.
(2) Measurement of Melting Point by Differential Scanning Calorimeter (DSC)

In accordance with JIS K7121-2012, a DSC measurement apparatus (produced by Seiko Instruments Inc.) was used, and about 5 mg of a sample was heated at 150° C. for 10 min and kept in a molten state. Thereafter, the temperature was lowered at a rate of 10° C./min, and the resulting product was held stable at −50° C. The temperature was then increased to 150° C. at 10° C./min, and the peak melting temperature at which the sample was melted was measured. The obtained temperature was used as the melting point for evaluation.
(3) Measurement of Z-Average Particle Size (Simply Referred to Below as "the Average Particle Size")

The average particle size (Z-average particle size) was measured based on intensity distribution by a dynamic light scattering method with a Zetasizer Nano-ZS, Model ZEN3600, produced by Malvern Panalytical. The measurement was performed three times at 25° C. using a sample obtained by adjusting the solids content of the aqueous dispersion composition to a concentration of 0.05 g/L to obtain an average value.

Production Example 1

280 g of a propylene-butene copolymer (propylene component content: 70 mol %, butene component content: 30 mol %), 20 g of maleic anhydride, 7 g of dicumyl peroxide, and 420 g of toluene were placed in an autoclave equipped with a stirrer. After nitrogen substitution was performed for about 5 minutes, the mixture was reacted at 140° C. for 5 hours with heating and stirring. After the reaction was completed, the reaction liquid was poured into a large amount of methyl ethyl ketone to deposit the resin. This resin was further washed several times with methyl ethyl ketone to remove unreacted maleic anhydride. The resulting resin was dried under reduced pressure to thus obtain a solid product of an acid-modified polyolefin resin (PO-1). The results of infrared absorption spectrum analysis indicate that the total content of the maleic anhydride component and the maleic acid component was 1.3 mass %. The weight average molecular weight measured by high-temperature GPC was 80000, and the melting point by DSC was 70° C.

Production Example 2

280 g of a propylene-ethylene copolymer (propylene component content: 94.1 mole %, ethylene component content: 5.9 mole %), 14 g of maleic anhydride, 5.6 g of dicumyl peroxide, and 420 g of toluene were placed in an autoclave equipped with a stirrer. After nitrogen substitution was performed for about 5 minutes, the mixture was reacted for 5 hours at 140° C. with heating and stirring. After the reaction was completed, the reaction liquid was poured into a large amount of methyl ethyl ketone to deposit the resin. This resin was further washed several times with methyl ethyl ketone to remove unreacted maleic anhydride. After drying under reduced pressure, 280 g of the resulting maleic anhydride-modified polyolefin resin and 2520 g of chloroform were placed in an autoclave equipped with a stirrer. After nitrogen substitution was performed for about 5 minutes, the mixture was heated to 110° C. to sufficiently dissolve the resin. Next, 1.4 g of tert-butyl peroxy-2-ethylhexanoate was added, and a predetermined amount of chlorine gas was supplied. The reaction solvent, which was chloroform, was distilled off under reduced pressure, and the resulting product was dried to thus obtain a solid product of an acid-modified chlorinated polyolefin resin (CPO-1) with a chlorine content of 18 mass %, a weight average molecular weight of 100000, a melting point by DSC of 85° C., and a maleic anhydride content of 0.9 mass %.

Example 1: Production of Aqueous Resin Composition (a)

100 g of the acid-modified polyolefin resin obtained in Production Example 1, 46 g of cyclohexyl methacrylate, 46 g of lauryl methacrylate, 4 g of 2-hydroxyethyl methacrylate, 4 g of 4-hydroxybutyl methacrylate, 15 g of polyoxyethylene styrenated phenyl ether (produced by DKS Co. Ltd., product name: NOIGEN EA-197, a nonionic surfactant), and 1.5 g of sodium dioctyl sulfosuccinate (produced by DKS Co. Ltd., product name: NEOCOL P, an anionic surfactant) were placed in a 2-liter four-necked flask equipped with a condenser, a thermometer, a stirrer, and a dropping funnel. The mixture was fully dissolved while the temperature was maintained at 100° C. Then, 3.2 g of N,N-dimethylethanolamine was added to this solution, and the mixture was stirred for 15 minutes. Thereafter, 500 g of deionized water heated to 95° C. in advance was added dropwise from the dropping funnel over a period of 30 minutes under vigorous stirring to allow the acid-modified polyolefin resin to undergo phase inversion emulsification. After this emulsified liquid was cooled to 80° C., nitrogen was introduced into the system to sufficiently perform nitrogen substitution. Next, an aqueous solution of 0.6 g of ammonium persulfate dissolved in 30 g of deionized water was added while the temperature was maintained at 80° C., and polymerization was initiated under a stream of nitrogen. The reaction was carried out at 80° C. for 8 hours under a stream of nitrogen, followed by cooling, to thus obtain an aqueous resin composition (a) having a resin concentration (solids content) of 30 mass % and an average particle size of the resin particles of 140 nm. The theoretical Tg of the (meth)acrylic acid ester copolymer (B) was −14.1° C.

Example 2: Production of Aqueous Resin Composition (b)

The same method was performed as in Example 1, except that the type of each component was changed to the formulation shown in Table 1, thus obtaining an aqueous resin composition (b) having a resin concentration (solids content) of 30 mass % and an average particle size of the resin particles of 160 nm. The theoretical Tg of the (meth)acrylic acid ester copolymer (B) was 46.5° C.

Example 3: Production of Aqueous Resin Composition (c)

The same method was performed as in Example 1, except that the amount of each component was changed to the formulation shown in Table 1, thus obtaining an aqueous resin composition (c) having a resin concentration (solids content) of 30 mass % and an average particle size of the resin particles of 180 nm. The theoretical Tg of the (meth)acrylic acid ester copolymer (B) was −14.1° C.

Example 4: Production of Aqueous Resin Composition (d)

The same method was performed as in Example 1, except that the amount of each component was changed to the formulation shown in Table 1, thus obtaining an aqueous resin composition (d) having a resin concentration (solids content) of 30 mass % and an average particle size of the resin particles of 100 nm. The theoretical Tg of the (meth)acrylic acid ester copolymer (B) was −14.1° C.

Example 5: Production of Aqueous Resin Composition (e)

The same method was performed as in Example 1, except that the type of each component was changed to the formulation shown in Table 1, thus obtaining an aqueous resin composition (e) having a resin concentration (solids content) of 30 mass % and an average particle size of the resin particles of 140 nm. The theoretical Tg of the (meth)acrylic acid ester copolymer (B) was −35.1° C.

Example 6: Production of Aqueous Resin Composition (f)

The same method was performed as in Example 1, except that the type of each component was changed to the formulation shown in Table 1, thus obtaining an aqueous resin composition (f) having a resin concentration (solids content) of 30 mass % and an average particle size of the resin particles of 130 nm. The theoretical Tg of the (meth)acrylic acid ester copolymer (B) was 46.5° C.

Example 7: Production of Aqueous Resin Composition (g)

The same method was performed as in Example 1, except that the type of each component was changed to the formulation shown in Table 1, thus obtaining an aqueous resin composition (g) having a resin concentration (solids content) of 30 mass % and an average particle size of the resin particles of 180 nm. The theoretical Tg of the (meth)acrylic acid ester copolymer (B) was 25.6° C.

Example 8: Production of Aqueous Resin Composition (h)

The same method was performed as in Example 1, except that the type of each component was changed to the formulation shown in Table 1, thus obtaining an aqueous resin composition (h) having a resin concentration (solids content) of 30 mass % and an average particle size of the resin particles of 180 nm. The theoretical Tg of the (meth)acrylic acid ester copolymer (B) was −7.9° C.

Example 9: Production of Aqueous Resin Composition (i)

The same method was performed as in Example 1, except that the type of each component was changed to the formulation shown in Table 1, thus obtaining an aqueous resin composition (i) having a resin concentration (solids content) of 30 mass % and an average particle size of the resin particles of 150 nm. The theoretical Tg of the (meth)acrylic acid ester copolymer (B) was −15.2° C.

Example 10: Production of Aqueous Resin Composition (j)

The same method was performed as in Example 1, except that the type of each component was changed to the formulation shown in Table 1, thus obtaining an aqueous resin composition (j) having a resin concentration (solids content) of 30 mass % and an average particle size of the resin particles of 110 nm. The theoretical Tg of the (meth)acrylic acid ester copolymer (B) was −37.9° C.

Comparative Example 1: Production of Aqueous Resin Composition (k)

100 g of the acid-modified polyolefin obtained in Production Example 1, 90 g of toluene, 90 g of isopropyl alcohol, and 15 g of polyoxyethylene styrenated phenyl ether (produced by DKS Co. Ltd., product name: NOIGEN EA-197, a nonionic surfactant) were placed in a 2-liter four-necked flask equipped with a condenser, a thermometer, a stirrer, and a dropping funnel. The mixture was fully dissolved while the temperature was maintained at 100° C. Then, 3.2 g of N,N-dimethylethanolamine was added to this solution, and the mixture was stirred for 15 minutes. Thereafter, 300 g of deionized water heated to 95° C. in advance was added dropwise from the dropping funnel over a period of 30 minutes under vigorous stirring to allow the acid-modified polyolefin to undergo phase inversion emulsification. The resulting emulsified liquid was cooled to 60° C., and the solvent was removed under reduced pressure, thus obtaining an aqueous resin composition (k) having a resin concentration (solids content) of 30 mass % and an average particle size of the resin particles of 130 nm.

Comparative Example 2: Production of Aqueous Resin Composition (l)

The same method was performed as in Example 1, except that the type of each component was changed to the formulation shown in Table 1, thus obtaining an aqueous resin composition (l) having a resin concentration (solids content) of 30 mass % and an average particle size of the resin particles of 130 nm. The theoretical Tg of the (meth)acrylic acid ester copolymer (B) was 78.9° C.

Comparative Example 3: Production of Aqueous Resin Composition (m)

The same method was performed as in Example 1, except that the type of each component was changed to the formulation shown in Table 1, thus obtaining an aqueous resin composition (m) having a resin concentration (solids content) of 30 mass % and an average particle size of the resin particles of 180 nm. The theoretical Tg of the (meth)acrylic acid ester copolymer (B) was 21.2° C.

The meaning of each symbol in Table 1 is as follows. LMA: lauryl methacrylate (Tg=−65° C.), SMA: stearyl methacrylate (Tg=38° C.), CHMA: cyclohexyl methacrylate (Tg=66° C.), MMA: methyl methacrylate (Tg=105° C.), EHMA: 2-ethylhexyl methacrylate (Tg=−10° C.), HEMA: 2-hydroxyethyl methacrylate (Tg=55° C.), 4HBA: 4-hydroxybutyl acrylate (Tg=−40° C.), DMAA: dimethyl acrylamide (Tg=119° C.), and styrene (Tg=100° C.).

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Aqueous resin composition | | | a | b | c | d | e | f | g |
| Acid-modified polyolefin (A) (g) | Production Example 1 | PO-1 | 100.0 | 100.0 | 100.0 | 50.0 | 70.0 | — | — |
| | Production Example 2 | CPO-1 | — | — | — | — | — | 100.0 | 100.0 |
| | Melting point (° C.) | | 70 | 70 | 70 | 70 | 70 | 85 | 85 |
| (Meth)acrylic acid ester copolymer (B) (g) | (B1) | LMA (C12) | 46.0 | — | 36.8 | 46.0 | 64.4 | — | 92 |
| | | SMA (C18) | — | 46.0 | — | — | — | 46.0 | — |
| | (B2) | CHMA (C6) | 46.0 | 46.0 | 36.8 | 46.0 | 27.6 | 46.0 | 36.8 |
| | | MMA (C1) | — | — | — | — | — | — | — |
| | | EHMA(C8) | — | — | — | — | — | — | — |
| | (B3) | HEMA (OH group) | 4.0 | 4.0 | 3.2 | 4.0 | 4.0 | 4.0 | 2.0 |
| | | 4HBA (OH group) | 4.0 | 4.0 | 3.2 | 4.0 | 4.0 | 4.0 | 2.0 |
| | | DMAA (amide group) | — | — | — | — | — | — | — |
| | Others | Styrene | — | — | — | — | — | — | — |
| | (B1)/(B2) (mass ratio) | | 50/50 | 50/50 | 50/50 | 50/50 | 70/30 | 50/50 | 20/80 |
| | Glass transition temperature (° C.) | | −14.1 | 46.5 | −14.1 | −14.1 | −35.1 | 46.5 | 25.6 |
| (A)/(B) (mass ratio) | | | 100/100 | 100/100 | 100/80 | 100/200 | 100/143 | 100/100 | 100/50 |
| Surfactant (g) | | NOIGEN EA-197 | 15.0 | 15.0 | 15.0 | 15.0 | 15.0 | 15.0 | 15.0 |
| | | NEOCOL P | 1.5 | 1.5 | 1.5 | 1.5 | 1.5 | 1.5 | 1.5 |
| Basic compound (g) | | N,N-Dimethyl-ethanolamine | 3.2 | 3.2 | 3.2 | 3.2 | 3.2 | 3.2 | 3.2 |
| Ammonium persulfate (g) | | | 0.6 | 0.6 | 0.6 | 0.6 | 0.6 | 0.6 | 0.6 |
| Toluene | | | — | — | — | — | — | — | — |
| Isopropyl alcohol (g) | | | — | — | — | — | — | — | — |
| Deionized water (g) | | | 500.0 | 500.0 | 500.0 | 500.0 | 500.0 | 500.0 | 500.0 |
| Average particle size (nm) | | | 140 | 160 | 180 | 100 | 140 | 130 | 180 |

| | | | Ex. 8 | Ex. 9 | Ex. 10 | Com. Ex. 1 | Com. Ex 2 | Com. Ex 3 |
|---|---|---|---|---|---|---|---|---|
| Aqueous resin composition | | | h | i | j | k | l | m |
| Acid-modified polyolefin (A) (g) | Production Example 1 | PO-1 | 100.0 | 100.0 | 100.0 | 100.0 | 100.0 | 100.0 |
| | Production Example 2 | CPO-1 | — | — | — | — | — | — |
| | Melting point (° C.) | | 70 | 70 | 70 | 70 | 70 | 70 |
| (Meth)acrylic acid ester copolymer (B) (g) | (B1) | LMA (C12) | 46.0 | 50.0 | 46.0 | — | — | — |
| | | SMA (C18) | — | — | — | — | — | — |
| | (B2) | CHMA (C6) | 46.0 | 50.0 | — | — | 50.0 | 46.0 |
| | | MMA (C1) | — | — | — | — | 30.0 | — |
| | | EHMA(C8) | — | — | 46.0 | — | — | 46.0 |
| | (B3) | HEMA (OH group) | — | — | 4.0 | — | 10.0 | 4.0 |
| | | 4HBA (OH group) | — | — | 4.0 | — | — | 4.0 |
| | | DMAA (amide group) | 8.0 | — | — | — | — | — |
| | Others | Styrene | — | — | — | — | 10.0 | — |
| | (B1)/(B2) (mass ratio) | | 50/50 | 50/50 | 50/50 | — | 0/100 | 0/100 |
| | Glass transition temperature (° C.) | | −7.9 | −15.2 | −37.9 | — | 81.2 | 21.2 |

TABLE 1-continued

| | | | | | | | |
|---|---|---|---|---|---|---|---|
| (A)/(B) (mass ratio) | | 100/100 | 100/100 | 100/100 | 100/0 | 100/100 | 100/100 |
| Surfactant (g) | NOIGEN EA-197 | 15.0 | 15.0 | 15.0 | 15.0 | 15.0 | 15.0 |
| | NEOCOL P | 1.5 | — | 1.5 | 1.5 | 1.5 | 1.5 |
| Basic compound (g) | N,N-Dimethyl-ethanolamine | 3.2 | 3.2 | 3.2 | 3.2 | 3.2 | 3.2 |
| Ammonium persulfate (g) | | 0.6 | — | 0.6 | 0.6 | 0.6 | 0.6 |
| Toluene | | — | — | — | — | 90 | — |
| Isopropyl alcohol (g) | | — | — | — | — | 90 | — |
| Deionized water (g) | | 500.0 | 300.0 | 500.0 | 500.0 | 500.0 | 500.0 |
| Average particle size (nm) | | 180 | 150 | 110 | 130 | 130 | 180 |

The aqueous resin compositions (a) to (m) obtained in Examples 1 to 10 and Comparative Examples 1 to 3 above were evaluated for the following properties. Table 1 shows the results.

(1) Adhesion 2 g of propylene glycol monomethyl ether as a coalescing agent and 2 g of DYNOL 604 (produced by Air Products and Chemicals, Inc.) as a wetting agent were added to 100 g of the aqueous resin composition, and the mixture was stirred with a magnetic stirrer for 30 minutes. This emulsion was spray-coated on a polypropylene plate (produced by Nippon Testpanel Co., Ltd) and washed with isopropyl alcohol so that the dry coating thickness was 10 μm. After drying at 80° C. for 3 minutes, a 2K urethane paint (RETAN PG White III, produced by Kansai Paint Co., Ltd.) was spray-painted to form a protective film with a thickness of 40 to 50 μm. After drying at 80° C. for 30 minutes, the resulting product was allowed to stand in an atmosphere at a temperature of 25° C. and a relative humidity of 60% for 24 hours to obtain a test plate. A grid of 100 squares at intervals of 1 mm that reached the substrate was formed on the test plate, and cellophane tape was pressed on the squares and pulled off at an angle of 90 degrees relative to the coating surface. This procedure was repeated three times, and the results were evaluated as A when no peeling was observed, B when peeling occurred on the third time, and C when peeling occurred on the second time or earlier.

(2) Water Resistance

The test plate obtained by the method described in (1) above was immersed in hot water at 40° C. for 240 hours. Subsequently, the adhesion was evaluated in the same manner as described in (1) above. Further, the occurrence of blistering (lifting or swelling of the coating film) was confirmed by observing the appearance of the coating film. The results were evaluated as A when no peeling or blistering occurred, B when no peeling occurred but blistering occurred, and C when peeling occurred.

(3) Peel Strength

A test plate was prepared in the same manner as in (1) above, except that the protective film obtained by spray coating had a thickness of 100 μm. The test plate was allowed to stand in an atmosphere at a temperature of 25° C. and a relative humidity of 60% for another 48 hours, and the resulting test plate was used as a test plate. Using the test plate, strip-shaped peeling samples (intervals: 1 cm) were prepared, and a 180° peeling test (50 mm) was carried out with a tensile tester (TENSILON RTG-1310, produced by A&D Company, Limited) at a speed of 50 mm/min. The stress under tension was defined as the peel strength, and the average values of five tests were used as the measurement results.

(4) Compatibility

Each aqueous resin composition was mixed with SUPERFLEX 150HS (produced by DKS Co. Ltd., polyurethane emulsion, solids content: 38 mass %) and PRIMAL 2133 (produced by Rohm and Haas Japan Co., Ltd., acrylic emulsion, solids content: 41.5 mass %) in a mass ratio on a solids content basis of 1:1. The resulting mixtures were applied to a glass plate with a 50-μm applicator and dried at 80° C. for 30 minutes. The state of the glass plate after drying was visually observed and evaluated as A when both coating films were transparent, B when one of the coating films was cloudy, and C when both coating films were cloudy.

(5) Stability with High Resin Content

The aqueous resin compositions obtained in the Examples and the Comparative Examples above were concentrated to a resin concentration of 45 mass %, and the fluidity was confirmed by observing the appearance. The results were evaluated as A when fluidity was observed, and B when no fluidity was observed due to significant thickening.

TABLE 2

| | | | Ex. 1 | Ex. 2 | Ex. 3 | Ex. 4 | Ex. 5 | Ex. 6 | Ex. 7 |
|---|---|---|---|---|---|---|---|---|---|
| Aqueous resin composition | | | a | b | c | d | e | f | g |
| Acid-modified polyolefin (A) (g) | Production Example 1 | PO-1 | 100.0 | 100.0 | 100.0 | 50.0 | 70.0 | — | — |
| | Production Example 2 | CPO-1 | — | — | — | — | — | 100.0 | 100.0 |
| | Melting point (° C.) | | 70 | 70 | 70 | 70 | 70 | 85 | 85 |
| (Meth)acrylic acid ester copolymer (B) (g) | (B1) | LMA (C12) | 46.0 | — | 36.8 | 46.0 | 64.4 | — | 9.2 |
| | | SMA (C18) | — | 46.0 | — | — | — | 46.0 | — |
| | (B2) | CHMA (C6) | 46.0 | 46.0 | 36.8 | 46.0 | 27.6 | 46.0 | 36.8 |
| | | MMA (C1) | — | — | — | — | — | — | — |
| | | EHMA (C8) | — | — | — | — | — | — | — |
| | (B3) | HEMA (OH group) | 4.0 | 4.0 | 3.2 | 4.0 | 4.0 | 4.0 | 2.0 |
| | | 4HBA (OH group) | 4.0 | 4.0 | 3.2 | 4.0 | 4.0 | 4.0 | 2.0 |

TABLE 2-continued

|  |  |  |  |  |  |  |  |  |
|---|---|---|---|---|---|---|---|---|
|  | DMAA (amide group) | — | — | — | — | — | — | — |
| Others | Styrene | — | — | — | — | — | — | — |
| (B1)/(B2) (mass ratio) |  | 50/50 | 50/50 | 50/50 | 50/50 | 70/30 | 50/50 | 20/80 |
| Glass transition temperature (° C.) |  | −14.1 | 46.5 | −14.1 | −14.1 | −35.1 | 46.5 | 25.6 |
| (A)/(B) (mass ratio) |  | 100/100 | 100/100 | 100/80 | 100/200 | 100/143 | 100/100 | 100/50 |
| Adhesion to PP |  | A | A | A | A | A | A | A |
| Water resistance |  | A | A | A | A | A | A | A |
| 180° peel strength (gf/cm) |  | 1220 | 1200 | 1250 | 920 | 1120 | 1000 | 1060 |
|  |  | AA | AA | AA | B | A | A | A |
| Compatibility |  | A | A | A | A | A | A | B |
| Stability with high resin content (45%) |  | A | A | A | A | A | A | A |

|  |  |  | Ex. 8 | Ex. 9 | Ex. 10 | Com. Ex. 1 | Com. Ex. 2 | Com. Ex. 3 |
|---|---|---|---|---|---|---|---|---|
| Aqueous resin composition |  |  | h | i | j | k | l | m |
| Acid-modified polyolefin (A) (g) | Production Example 1 | PO-1 | 100.0 | 100.0 | 100.0 | 100.0 | 100.0 | 100.0 |
|  | Production Example 2 | CPO-1 | — | — | — | — | — | — |
|  | Melting point (° C.) |  | 70 | 70 | 70 | 70 | 70 | 70 |
| (Meth)acrylic acid ester copolymer (B) (g) | (B1) | LMA (C12) | 46.0 | 50.0 | 46.0 | — | — | — |
|  |  | SMA (C18) | — | — | — | — | — | — |
|  | (B2) | CHMA (C6) | 46.0 | 50.0 | — | — | 50.0 | 46.0 |
|  |  | MMA (C1) | — | — | — | — | 30.0 | — |
|  |  | EHMA (C8) | — | — | 46.0 | — | — | 46.0 |
|  | (B3) | HEMA (OH group) | — | — | 4.0 | — | 10.0 | 4.0 |
|  |  | 4HBA (OH group) | — | — | 4.0 | — | — | 4.0 |
|  |  | DMAA (amide group) | 8.0 | — | — | — | — | — |
|  | Others | Styrene | — | — | — | — | 10.0 | — |
| (B1)/(B2) (mass ratio) |  |  | 50/50 | 50/50 | 50/50 | — | 0/100 | 0/100 |
| Glass transition temperature (° C.) |  |  | −7.9 | −15.2 | −37.9 | — | 78.9 | 21.2 |
| (A)/(B) (mass ratio) |  |  | 100/100 | 100/100 | 100/100 | 100/0 | 100/100 | 100/100 |
| Adhesion to PP |  |  | A | B | A | A | A | A |
| Water resistance |  |  | A | B | B | A | B | A |
| 180° peel strength (gf/cm) |  |  | 1050 | 1200 | 1240 | 1250 | 520 | 650 |
|  |  |  | A | AA | AA | AA | C | C |
| Compatibility |  |  | A | B | A | B | A | A |
| Stability with high resin content (45%) |  |  | A | A | A | B | A | A |

Discussion of the Results Shown in Table 2

Table 2 clearly indicates that the aqueous resin compositions (a) to (j) obtained in Examples 1 to 10 above showed high peel strength comparable to that of the aqueous resin composition (k), which was a dispersion of polyolefin alone, when baked at 80° C. Table 2 also clearly indicates that these aqueous resin compositions had excellent water resistance and excellent stability with a high resin content. However, when the ratio of the acid-modified polyolefin to the (meth)acrylic acid ester copolymer, or the formulations of the acid-modified polyolefin and the (meth)acrylic acid ester copolymer, were outside the ranges of the present invention, peel strength was insufficient, and adhesion to polyolefin substrates, as well as water resistance, were unsatisfactory.

The invention claimed is:

1. An aqueous resin composition comprising an acid-modified polyolefin resin (A) and a (meth)acrylic acid ester copolymer (B),
wherein the acid-modified polyolefin resin (A) contains an unsaturated carboxylic acid or an anhydride thereof in an amount of 0.5 to 10 mass %, and wherein the (meth)acrylic acid ester copolymer (B) contains as copolymerization components a (meth)acrylic acid ester (B1), whose ester moiety is a hydrocarbon group with 12 or more carbon atoms, and a (meth)acrylic acid ester (B2), whose ester moiety is a hydrocarbon group with 11 or less carbon atoms,
wherein the content of the (meth)acrylic acid ester copolymer (B) is 80 to 250 parts by mass per 100 parts by mass of the acid-modified polyolefin resin (A),
wherein the (meth)acrylic acid ester copolymer (B) contains the (meth)acrylic acid ester (B1), whose ester moiety is a hydrocarbon group with 12 or more carbon atoms, and the (meth)acrylic acid ester (B2), whose ester moiety is a hydrocarbon group with 11 or less carbon atoms, in a mass ratio of 70/30 to 20/80,
wherein the (meth)acrylic acid ester copolymer (B) further contains a polar-group-containing monomer (B3), and the polar-group-containing monomer (B3) is at least one selected from an acrylic acid ester whose ester moiety contains a polar group, and an acrylamide compound, and
wherein an amount of the polar-group-containing monomer (B3) is 6 to 40 mass % based on the (meth)acrylic acid ester copolymer (B).

2. The aqueous resin composition according to claim 1, further comprising a surfactant or a basic compound, or both.

3. The aqueous resin composition according to claim 1, wherein the (meth)acrylic acid ester copolymer (B) has a glass transition temperature (Tg) of −40° C. to 80° C.

4. The aqueous resin composition according to claim 1, wherein the acid-modified polyolefin resin (A) has a melting point measured by differential scanning calorimetry (DSC) of 90° C. or lower.

5. A paint for polyolefin substrates, comprising the aqueous resin composition of claim 1.

6. An ink for polyolefin substrates, comprising the aqueous resin composition of claim 1.

7. An adhesive for polyolefin substrates, comprising the aqueous resin composition of claim 1.

8. A sealing agent for polyolefin substrates, comprising the aqueous resin composition of claim 1.

9. A primer for polyolefin substrates, comprising the aqueous resin composition of claim 1.

10. The aqueous resin composition according to claim 1, wherein the acrylic acid ester whose ester moiety contains a polar group is at least one compound selected from the group consisting of 2-hydroxyethyl (meth)acrylate, 2-hydroxypropyl (meth)acrylate, 2-hydroxybutyl (meth)acrylate, 4-hydroxybutyl (meth)acrylate, dicyclopentenyl (meth)acrylate, glycidyl (meth)acrylate, methylglycidyl (meth)acrylate, 3,4-epoxycyclohexanemethyl methacrylate, tetrahydrofurfuryl (meth)acrylate, polyethylene glycol mono (meth)acrylate, polyethylene glycol di(meth)acrylate, polypropylene glycol mono (meth)acrylate, polypropylene glycol di(meth)acrylate, polytetramethylene glycol mono (meth)acrylate, polytetramethylene glycol di(meth)acrylate, dimethylaminoethyl (meth)acrylate, and diethylaminoethyl (meth)acrylate.

11. The aqueous resin composition according to claim 1, wherein the acrylamide compound is at least one compound selected from the group consisting of (meth)acrylamide, dimethyl (meth)acrylamide, diethyl (meth)acrylamide, and dimethylaminopropyl meth)acrylamide.

12. The aqueous resin composition according to claim 1, wherein the (meth)acrylic acid ester copolymer (B) further contains a styrene monomer.

13. The aqueous resin composition according to claim 12, wherein the styrene monomers is at least one compound selected from the group consisting of styrene, α-methylstyrene, para-methylstyrene, and divinylbenzene.

* * * * *